United States Patent
Fischer

(10) Patent No.: US 10,075,419 B2
(45) Date of Patent: Sep. 11, 2018

(54) METHOD AND DEVICE TO PROTECT A DECRYPTED MEDIA CONTENT BEFORE TRANSMISSION TO A CONSUMPTION DEVICE

(71) Applicant: NAGRAVISION S.A., Cheseaux-sur-Lausanne (CH)

(72) Inventor: Jean-Bernard Fischer, Rochejean (FR)

(73) Assignee: NAGRAVISION S.A., Cheseaux-sur- (CH)

( * ) Notice: Subject to any disclaimer, the term of this patent is extended or adjusted under 35 U.S.C. 154(b) by 108 days.

(21) Appl. No.: 15/076,052

(22) Filed: Mar. 21, 2016

(65) Prior Publication Data

US 2016/0277367 A1    Sep. 22, 2016

(30) Foreign Application Priority Data

Mar. 20, 2015 (EP) .................................. 15159981

(51) Int. Cl.
*G06F 21/00* (2013.01)
*H04L 29/06* (2006.01)
(Continued)

(52) U.S. Cl.
CPC .......... *H04L 63/0464* (2013.01); *G06F 21/10* (2013.01); *H04L 9/0819* (2013.01);
(Continued)

(58) Field of Classification Search
CPC ............. H04L 63/0464; H04L 63/0819; H04L 63/0861; H04L 9/0819; H04L 9/0861;
(Continued)

(56) References Cited

U.S. PATENT DOCUMENTS

2007/0185878 A1* 8/2007 Fierstein ................. G06F 21/10
2008/0267398 A1* 10/2008 Peterka ............ G11B 20/00086
380/200

(Continued)

OTHER PUBLICATIONS

European Search Report issued in EP 15159981.8 dated Sep. 24, 2015.

*Primary Examiner* — Joseph P Hirl
*Assistant Examiner* — Chi Nguy
(74) *Attorney, Agent, or Firm* — DLA Piper LLP US

(57) ABSTRACT

A method to protect a media content encrypted by a media content key, said method being carried out by a security module embedded into a reception device and connected to a consumption device, comprising: receiving an encrypted media content, encrypted by a media content key; receiving a message, being encrypted by a personal key of the security module, containing the media content key; decrypting the message by the personal key to retrieve the media content key; decrypting the encrypted media content by the media content key; generating a current local key; encrypting a portion of the media content by the current local key, said portion defining a chunk; transmitting the current local key to the consumption device; transmitting the encrypted chunk to the consumption device; repeating the previous four steps for different chunks of the media content and modifying the current local key for the different chunks.

10 Claims, 2 Drawing Sheets

(51) Int. Cl.

| | | |
|---|---|---|
| *G06F 21/10* | (2013.01) | |
| *H04N 21/4408* | (2011.01) | |
| *H04N 21/845* | (2011.01) | |
| *H04L 9/08* | (2006.01) | |
| *H04N 21/418* | (2011.01) | |
| *H04N 21/4367* | (2011.01) | |
| *H04N 21/4405* | (2011.01) | |
| *H04N 21/4623* | (2011.01) | |
| *H04N 21/658* | (2011.01) | |

(52) U.S. Cl.
CPC ....... *H04L 9/0861* (2013.01); *H04N 21/4181* (2013.01); *H04N 21/4367* (2013.01); *H04N 21/4405* (2013.01); *H04N 21/4408* (2013.01); *H04N 21/4623* (2013.01); *H04N 21/6582* (2013.01); *H04N 21/8456* (2013.01); *G06F 2221/0706* (2013.01); *G06F 2221/0753* (2013.01); *G06F 2221/0784* (2013.01)

(58) Field of Classification Search
CPC ............... G06F 21/10; G06F 2221/075; G06F 2221/0706; G06F 2221/0784; G06F 2221/0753; H04N 21/4367; H04N 21/4405; H04N 21/4623; H04N 21/4181; H04N 21/6582; H04N 21/8456; H04N 21/4408
See application file for complete search history.

(56) References Cited

U.S. PATENT DOCUMENTS

| | | | |
|---|---|---|---|
| 2008/0301437 A1* | 12/2008 | Chevallier | ............. H04N 7/165 713/155 |
| 2012/0246462 A1 | 9/2012 | Moroney et al. | |
| 2013/0227283 A1 | 8/2013 | Williamson et al. | |
| 2014/0281481 A1* | 9/2014 | Moroney | ............ H04L 63/0457 713/151 |

\* cited by examiner

METHOD AND DEVICE TO PROTECT A DECRYPTED MEDIA CONTENT BEFORE TRANSMISSION TO A CONSUMPTION DEVICE

CROSS-REFERENCE TO RELATED APPLICATIONS

This application claims priority to European Application No. 15159981.8 filed Mar. 20, 2015, which is incorporated by reference in its entirety.

INTRODUCTION

The present application refers to the protection of conditional-access media content received and processed by a consumption device. The consumption device is in charge of receiving the protected media content and removing the protection in order to give access to a user to the media content.

BACKGROUND ART

Consumption devices such as set-top boxes, computers, tablets or any processing device connected to a screen are in charge of the reception of protected media content, the removal of the protection and the transmission of the unprotected media content to a consumer device such as a television.

The media content could be in the form of a video content and is generally encrypted by a unique key, the media content key. The so-called encrypted media content is stored in a management server while waiting for a request initiated by the consumption device.

When the consumption device, or the user of same, requests a media content, the message requesting said media content contains an identification of the consumption device. The management center can then prepare a secure message, containing the media content key, said secure message being encrypted with a key pertaining to the consumption device. This key is recovered by the management center thanks to the identification data provided in the request message. This means that the management center stores a personal key for each consumption device, the proper one being retrieved thanks to the identification data.

The secure message, encrypted by the personal key, is then sent to the consumption device. The latter decrypts the secure message, retrieves the media content key and decrypts the media content.

The consumption device comprises security means, e.g. in the form of a security module, a smartcard, a dedicated chip, or obfuscated software to carry out the decryption of the encrypted media content. It is then very difficult to break the security of the encrypted media content by tampering with the personal key. In some instances, the media content is stored locally and the decrypted media content is re-encrypted with a local key. So an attacker will focus on the consumption device to try to recover the local key to be able to obtain the valuable media content in clear.

In the case of a home gateway, the encrypted media content is received by the home gateway from the provider and decrypted using the security means of said home gateway. Before transmitting the media content to a consumption device, the media content is re-encrypted by a local key shared between the home gateway and the consumption device. The level of protection of the local key stored in the consumption device is less than in the security means of the home gateway and an attacker will focus his efforts on the recovery of the local key in the consumption device.

One attack on the content key while it is used to decrypt the content suffices to recover all the content in clear. So the pirate only needs to perform one attack per content, which is a big incentive: even if it take several days to hack the key, it is worthwhile to get access to a high value content. Moreover, since the content is often freely available from the CDN (content distribution network), he does not have to redistribute the content: he can simply redistribute the content key and let the recipients retrieve the content from the CDN.

SUMMARY

According to one embodiment of the disclosure, there is proposed a method and device to protect the decrypted media content before transmission to the consumption device. A method is proposed to protect a media content encrypted by a media content key, said method being carried out by a security module embedded into a reception device and in connection with a consumption device, said method comprising:

a. receiving an encrypted media content, said media content being encrypted by a media content key, b. receiving a message containing the media content key, said message being encrypted by a personal key of the security module, c. decrypting the message by the personal key to retrieve the media content key, d. decrypting the encrypted media content by the media content key, e. generating a current local key, f. encrypting a portion of the media content by the current local key, said portion defining a chunk, g. transmitting the current local key to the consumption device, h. transmitting the encrypted chunk to the consumption device, i.—repeating the steps e) to h) for different chunks of the media content and modifying the current local key for the different chunks.

According to the proposed solution, a media content entering into the security means is encrypted by a single key, the media content key. While exiting the secure environment of the security means, the media content is encrypted by a plurality of keys, each key being applied to a portion of the media content, named a chunk.

By introducing an intermediate high security device (i.e. the security module) that decrypts and re-encrypt the media content, the simple sharing of the re-encryption (local) content key is no more a solution and the pirate has to redistribute the content itself. By ciphering small chunks with different keys, the complexity of recovering all the thousands of keys to decipher the content make it very difficult for the pirate to decrypt the whole content in a reasonable time and for reasonable money, so that there is no incentive anymore to do it.

BRIEF DESCRIPTION OF THE FIGURES

The present invention will be better understood thanks to the attached figures in which.

DETAILED DESCRIPTION

Figure 1:
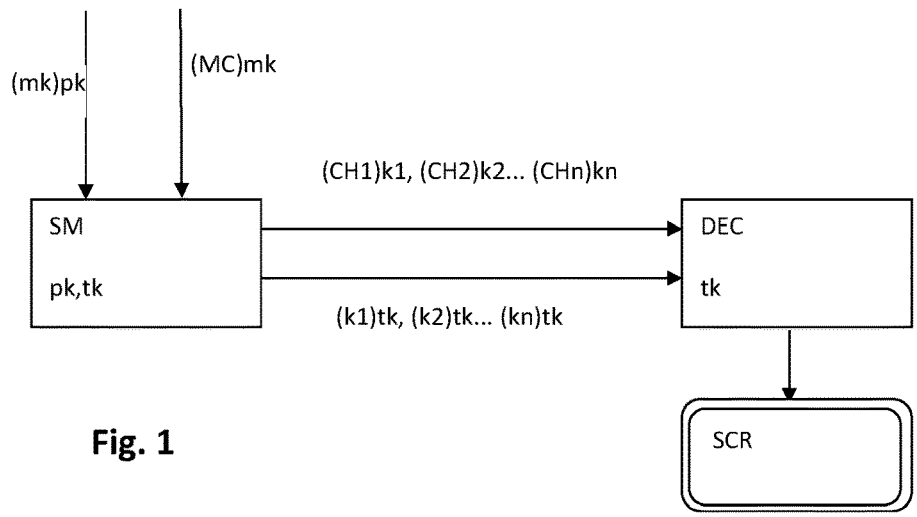
FIG. 1 represents the devices receiving, decrypting and re-encrypting the media content.
Figure 2:
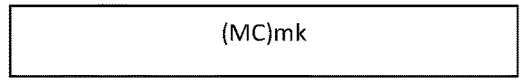
FIG. 2 illustrates the transformation of the media content.
Figure 2:
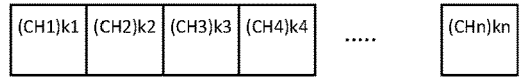

The FIG. 1 illustrates the different elements participating in the re-encryption process. A media content MC is provided by a provider to a consumption device containing a security module SM. A media content according to the present application is an audio/video content representing a single event such as a movie, a sport performance, a show, a documentary. The provider can send the media content via different communication means such as broadcast, IP, cable, terrestrial or any type of wireless network. The provider can be connected with a management center that handles the authorization to access media contents.

As it is well known from the man skilled in the art, the security module can essentially be realized according to four distinct forms. One of these forms is a microprocessor card, a smart card, or more generally an electronic module (taking the form of key, a badge, . . . ). Such a module is generally removable and connectable to the consumption device. The form with electric contacts is the most widely used (ISO 7816 or CAM), but a contactless connection for example of the type ISO 14443, Bluetooth, Wifi, could be used as well.

A second known form is represented by a dedicated integrated circuit box (e.g. system on chip), generally placed definitively and irremovably in the consumption device. An alternative is made up of a circuit mounted on a base or on a connector such as a SIM module connector.

In a third form, the security module is integrated into the consumption device as a dedicated silicon chip or being part of a main silicon chip in charge of the functioning of the consumption device.

In a fourth embodiment, the security module is not realized as hardware, but its function is implemented only in software form. Given that in the four cases, the function is identical although the security level differs, we can talk about a security module regardless of the way in which its function is carried out or the form that this module may take.

The media content MC is previously encrypted by a media key mk and sent to the consumption device (or decoder). The media key can be a key which is unique for the targeted security module SM and plays the role of the personal key. In other cases, the media key mk is randomly generated and the media content is encrypted by the media key even before the media content MC is requested by the consumption device. In this case, the media key mk is encrypted with a personal key pk of the security module. In the request for the media content MC, the consumption device identifies the security module SM by, for example, transmitting its unique address UA. Based on this information, the management center determines which personal key pk is stored in the identified security module SM.

The encrypted media key (mk)pk is sent to the consumption device and passed to the security module SM. The security module can then decrypt the encrypted media key or retrieve the media key mk.

Once the encrypted media content is received by the consumption device, it is transmitted to the security module for processing. The decrypted media key mk is used to decrypt the media content MD. At that time, the media content is re-encrypted using a current local key k. One particularity of the present scheme is that the local key is applied only to a portion of the media content, defined as a chunk. The chunk is preferably formed by a plurality of transport packets TS. Each packet has a packet header describing the content of the packet.

The size of a chunk can be chosen according to different parameters, such as the number of packets, the duration represented by the playback of a chunk (e.g. 10 sec.). The size can be fixed in the re-encryption system or can vary while the chunks are produced.

The security module SM adds a marker into the header of the packets to indicate which local key should be used for the packet. The key is changed for different chunks and the consumption device should be ready with the next key when the change occurs.

Various solutions to securely transmit the local key are proposed in the present application.

In a first embodiment, the message sent by the security module to the consumption device contains 2 keys, the odd and the even keys. The marker in the header of the packet indicates which key is to be used. At the beginning of a new chunk, the message sent along with the encrypted chunk comprises the current key (e.g. k1) and the next key (e.g. k2). Each time a new chunk is defined, a new message to the consumption device is sent comprising the current key and the next key.

In a second embodiment, the next local key is sent just before the next chunk starts. The key generator generates the next key while the current key is still in use. The next key is encrypted by the transport key and sent to the consumption device.

In a third embodiment, the encrypted local key is formatted into a key packet having a specific packet header and inserted into the stream of packets sent to the consumption device. When the local key change, a new packet containing the new local key is generated and inserted just before the packet using this new key. On the consumption device side, the packet containing the new key is processed and the key loaded into the decryption module of the consumption device, ready to process the next packet encrypted by the new key.

These local keys are encrypted with a transport key tk. This key can be a hardcoded key into the consumption device, in a secure memory, or can be negotiated between the security module and the consumption device prior the transmission of the chunks. In the latter case, the transport key tk is generated during an exchange of random numbers in order to create a secure channel. Examples of secure protocols are SSL or Diffie-Helmann. The transport key, once generated, is stored in a secure memory of the consumption device and deleted at the completion of the transmission of all chunks.

Figure 3:
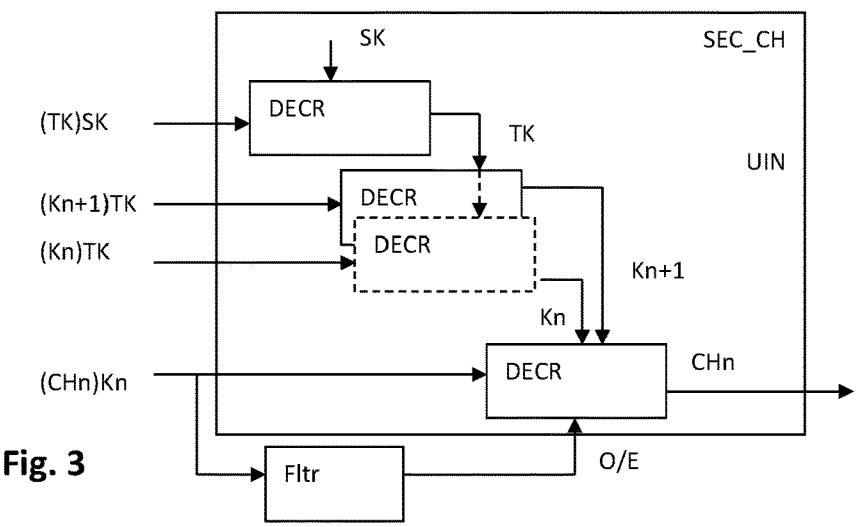
FIG. 3 illustrates a secure chip in the consumption device in charge of the decryption of the chunks.

According to an embodiment of the present method, the consumption device comprises a key ladder as illustrated in the FIG. 3. The consumption device containing the security module SM can request to a management center the right to distribute contents to the consumption device. For that purpose, the consumption device sends a request containing the identification of the consumption device, in particular the identification of the secure chip SEC_CH of the consumption device. The management center (linked with the provider) can then send to the reception device the secret key SK of the secure chip. The secret key is encrypted by the personal key pk of the security module SM and sent by the management center.

The security module SM generates a transport key TK, e.g. a randomly generated key. The security module then encrypts the transport key TK by the secret key SK of the secure chip and sends it to the consumption device. This cryptogram (TK)SK is loaded into the key ladder of the secure chip SEC_CH in order to produce the transport key TK with a suitable decryption module DECR. Once produced, the transport key TK is applied to another decryption module DECR. Once the encrypted local key Kn is received, the consumption device applies this encrypted key (Kn)TK to the second stage of the key ladder to produce the current local key Kn.

According to the first and second embodiment described above, and in order to have the local key ready when a change of keys occurs, the current key Kn and the next key Kn+1 are loaded into the decryption module of the consumption device. The secure chip receives the encrypted current key (Kn)TK and the next key (Kn+1)Tk. These two cryptograms are passed to the secure chip to produce the current key Kn and the next key Kn+1, thanks to the presence of the transport key TK obtained from the description of the first decryption module DECR.

The consumption device comprises a filter Fltr to analyze the header of the entering packets (CHn)Kn and to determine which key (ODD/EVEN) should be used. This information (O/E) is passed to the final decryption module in charge of obtaining the media content in clear (CHn).

The key ladder presented above is part of a secure chip SEC_CH and the intermediate results of the decryption modules DECR are not accessible outside the chip.

On the reception device side, in particular into the security module SM, a local key K1 is used to encrypt a chunk (CH1). The current local key is encrypted by the transport key TK to produce a first cryptogram which is the encrypted current local key (K1)TK. The encrypted next key (K2), forming a second cryptogram, is at least sent to the consumption device before the second key K2 is used to encrypt the next chunk. These cryptograms are sent to the consumption device for processing by the secure chip. In case that the cryptograms are sent via a different logical channel to the consumption device (and not as an additional packet inserted into the stream of packets), each cryptogram further comprises an indication of whether the encrypted key is odd or even, thus allowing the secure chip to load the cryptogram into the right input of the secure chip. This information odd/even is in line with the information added into the header of the encrypted packets by the security module SM.

In the case that the key K10 is currently in use, the flag "even" is added into the header of the encrypted chunk (CH10)K10. The encrypted keys (K10)TK and K11)TK are transmitted to the secure chip. The first cryptogram (K10)TK comprises the flag "even" and the second cryptogram (K11)TK comprises the flag "odd". As a consequence, the final decryption module is loaded with the even key K10 and the odd key K11. The information extracted from the header of the encrypted packets indicates the status "even" and the even key K10 is loaded into the decryption module. In the case that the key is changed by the security module SM, the next key K11 is ready to be used as soon as the filter Fltr detects a new status in the header of the encrypted packets.

The secure chip SEC_CH is part of the consumption device and preloaded with the secret key SK, unique per secure chip. This key is deeply hidden into the silicon and cannot be extracted. Each secure chip is also associated with a unique identification number UIN used to identify the consumption device (and more particularly the secure chip) while the consumption device is requesting the secret key SK to the management center. While requesting the secret key SK of a given consumption device, the request can also contain an identification of the security module SM. The management center can then authorize or deny the communication between the reception device and the consumption device by sending or not the secret key to the consumption device.

According to an embodiment, the secret key SK is not sent to the security module and never leaves the secure database of the management center. The security module SM, via the consumption device, requests the generation of a cryptogram (TK)SK, this request containing the transport key TK and the identification of the secure chip UIN. The management center, after having retrieved the corresponding secret key based on the identification UIN, encrypts the received transport key TK with the retrieved secret key SK. This cryptogram (TK)SK is sent to the security module and passed to the consumption device. Once decrypted by the first decryption module DECR using the secret key SK, the transport key TK is available for the next decryption modules. While requesting the encrypted transport key of a given consumption device, the request can also contain an identification of the security module SM. The management center can then authorize or deny the communication between the reception device and the consumption device by sending or not the encrypted secret key to the consumption device.

Figure 4:
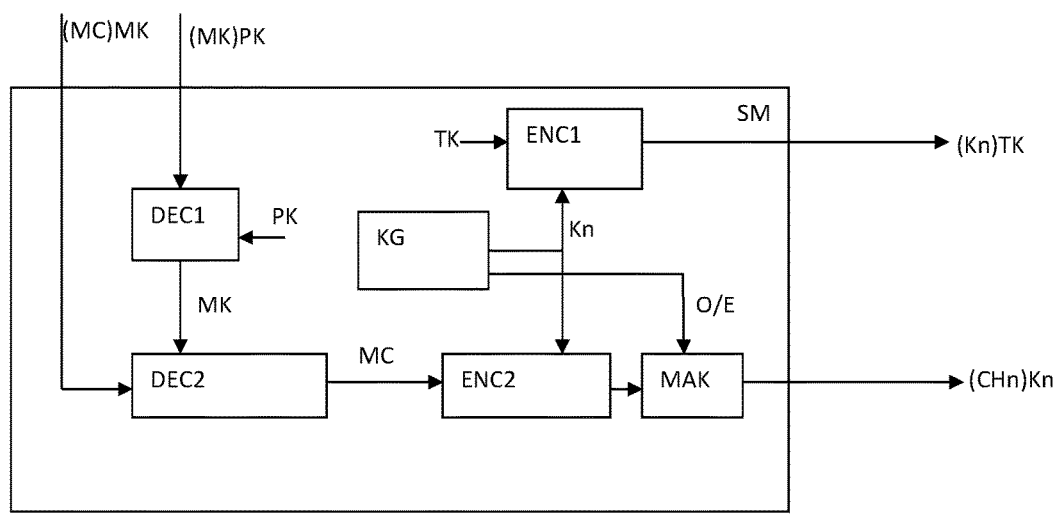
FIG. 4 illustrates the security module in charge of the decryption and re-encryption of a media content.

FIG. 4 illustrates a security module adapted to perform the present method. The security module is in charge of the decryption and the re-encryption of the media content. For that purpose, the security module SM comprises a first decryption module DEC1 in charge of decrypting the encrypted media key MK with the personal key PK being loaded into the security module. This decryption allows for the media key MK to be obtained, the media key being used by the second decryption module DEC2. The media content MC is made of a plurality of packets, for example TS packets. A packet is loaded into the decryption module DEC2 and decrypted using the media key MK. Once decrypted, the packet is passed to the encryption module ENC2 to be encrypted with the current local key Kn. The encrypted packet is then transferred to a marking module MAK which adds, to the header of a packet, the indication (O/E) of the key used, this indication being produced by the key generator KG. The packet is now ready to be sent to the consumption device.

The security module SM further comprises a key generator KG to generate the local keys K1, K2, K3 . . . Kn. These keys are used to encrypt a packet of the decrypted media content and are changed according to the rules contained in the key generator KG. In order to be ready when a change of keys occurs, the key generator KG generates the next local key, i.e. the key that will be used for the next chunk. Both this next local key and the current local key (generated as next local key during the encryption of the previous chunk) are securely sent to the consumption device.

The security module further contains a second encryption module ENC2 to encrypt the local keys Kn by the transport key TK.

The encrypted packets (CHn)kn as well as the encrypted local keys (Kn)TK are then sent to the consumption device.

The reception device, comprising the security module, is preferably a home device, such as a home gateway.

Although embodiments of the present disclosure have been described with reference to specific example embodiments, it will be evident that various modifications and changes may be made to these embodiments without departing from the broader scope of these embodiments. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived there from, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "disclosure" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The invention claimed is:

1. A method to protect a media content, said method comprising:
   a. receiving at a reception device an encrypted media content, said media content comprising a plurality of packets, said media content being encrypted by a media content key, said reception device being connectable to a security module;
   b. receiving a message containing the media content key, said message being encrypted by a personal key of the security module;
   c. decrypting the message using the personal key to retrieve the media content key;
   d. decrypting the encrypted media content using the media content key;
   e. generating a current local key;
   f. encrypting a subset of the packets of the media content by the current local key, said subset of the packets defining a current chunk;
   g. generating a current local key packet containing the current local key in encrypted form;
   h. transmitting the current local key packet and the encrypted current chunk to a consumption device as part of a stream of packets, the current local key packet being positioned in the stream of packets before the encrypted current chunk; and
   i. repeating the steps e) to h) for additional chunks of the media content and modifying the current local key for different chunks of the media content.

2. The method of claim 1, further comprising:
   defining each of the current local keys as an odd key or an even key; and
   marking a header of the packets of the media content with an indication allowing discrimination between odd and even keys;
   wherein successive current local keys alternate between odd keys and even keys.

3. The method of claim 1, wherein the new current local key packet is inserted into the stream of packets just before the encrypted current chunk.

4. The method of claim 1, wherein:
   a next local key, intended to be used with the next chunk, is generated and securely transmitted with the current local key to the consumption device.

5. The method of claim 1, wherein the consumption device comprises a secret key, and wherein said current local key is encrypted by the secret key before being transmitted to the consumption device.

6. The method of claim 1, wherein the consumption device comprises a consumption device identification and a secure chip storing a secret key, and wherein the method further comprises:
   transmitting by the security module to a management center, a request containing the consumption device identification and a randomly generated transport key;
   retrieving in the management center, using the consumption device identification, the secret key of said consumption device;
   encrypting the transport key using the secret key;
   transmitting the encrypted transport key to the consumption device;
   loading the encrypted transport key into the secure chip of the consumption device; and
   decrypting in the secure chip, the encrypted transport key in order to obtain the transport key.

7. The method of claim 1, wherein steps g) and h) involve transmission over a local area network.

8. A security module for use in a reception device, said security module comprising:
   a memory for storing a personal key;
   a first decryption module configured to receive and decrypt an encrypted media key with the personal key;
   a second decryption module configured to receive and decrypt an encrypted media content with the media key, said media content comprising a plurality of packets;
   a key generator configured to generate a plurality of local keys;
   a first encryption module configured to encrypt the local keys by a transport key; and
   a second encryption module configured to re-encrypt different subsets of the packets of the decrypted media content by one of the local keys, each subset being smaller than the entire media content so that different subsets of the media content will be encrypted by different local keys; and
   a transmitter to transmit the encrypted local keys and the re-encrypted subsets in a stream of packets, each local key in the stream of packets being positioned prior to a respective subset of the media content.

9. The security module of claim 8, wherein each re-encrypted subset of the packets of the media content is formed by a plurality of packets, each packet comprising a header, the security module further comprising a marking module configured to add an indication to the header of the packet indicating the local key used for the packet.

10. The security module of claim 8, further configured to:
    generate the transport key;
    send the transport key to a management center together with an identification of a target consumption device;
    receive the encrypted transport key, said key being encrypted by a secret key of the target consumption device; and
    transmit the encrypted transport key to the consumption device.

* * * * *